United States Patent
Boltz

[19]

[11] Patent Number: 6,131,024
[45] Date of Patent: Oct. 10, 2000

[54] SYSTEM AND METHOD FOR SETTING SUBSCRIBER-DEFINED USAGE LIMITS ON A MOBILE TERMINAL

[75] Inventor: David Boltz, Garland, Tex.

[73] Assignee: Ericsson Inc., Research Triangle Park, N.C.

[21] Appl. No.: 08/948,185

[22] Filed: Oct. 9, 1997

[51] Int. Cl.[7] .................................................. H04Q 7/00
[52] U.S. Cl. ....................... 455/405; 455/407; 455/408; 455/445
[58] Field of Search .................................... 455/405, 406, 455/407, 404, 410, 411, 445, 408

[56] References Cited

U.S. PATENT DOCUMENTS

| | | | |
|---|---|---|---|
| 5,465,401 | 11/1995 | Thompson | 455/89 |
| 5,577,029 | 11/1996 | Lu et al. | 455/445 |
| 5,673,306 | 9/1997 | Amadon et al. | 379/59 |
| 5,749,052 | 5/1998 | Hidem et al. | 455/406 |
| 5,778,313 | 7/1998 | Fougnies | 455/406 |
| 5,796,790 | 8/1998 | Brunner | 379/59 |
| 5,812,945 | 9/1998 | Hansen et al. | 455/405 |
| 5,826,185 | 10/1998 | Wise et al. | 455/405 |
| 5,852,812 | 12/1998 | Reeder | 705/39 |
| 5,854,975 | 12/1998 | Fougnies et al. | 455/405 |
| 5,864,755 | 1/1999 | King et al. | 455/404 |

FOREIGN PATENT DOCUMENTS

| | | |
|---|---|---|
| 0 746 135 A2 | 12/1996 | European Pat. Off. . |
| WO 92/16078 | 9/1992 | WIPO . |
| WO 93/12606 | 6/1993 | WIPO . |

OTHER PUBLICATIONS

PCT International Search Report dated Feb. 12, 1999.

*Primary Examiner*—Daniel S. Hunter
*Assistant Examiner*—Thuan T. Nguyen
*Attorney, Agent, or Firm*—Jenkens & Gilchrist, P.C.

[57] ABSTRACT

A telecommunications system and method for allowing the owner of a Mobile Station to define usage limits based on air time usage or by a dollar amount, e.g., charging information. When the limits are exceeded, the Mobile Station will be inoperable except for emergency calls or calls to predefined numbers established by the subscriber. The accumulated usage (time/dollar amount) can be reset and the Mobile Station returned to normal operation by the subscriber using a user-defined password.

35 Claims, 3 Drawing Sheets

SYSTEM AND METHOD FOR SETTING SUBSCRIBER-DEFINED USAGE LIMITS ON A MOBILE TERMINAL

BACKGROUND OF THE PRESENT INVENTION

1. Field of the Invention

The present invention relates generally to telecommunications systems and methods for limiting the usage of mobile telephones, and specifically to providing user-defined limits on mobile telephone usage based on increments of time or money.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio systems.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Currently, the billing system of the cellular network differs from that of the Public Switched Telephone (wireline) Network (PSTN). Unlike the PSTN network, subscribers in the cellular network can be charged not only on a per month basis for local calls, but also on a per call basis depending on the plan purchased. For example, a subscriber can choose a plan that allots a certain number of minutes of air time for a set fee before being charged for air time usage. The amount of air time usage is based not only on calls placed from the MS, but also on calls received by the MS.

It is therefore difficult for many subscribers to accurately predict or control the amount they are charged for cellular service, especially when the MS 20 is being used by another party not responsible for billing. For example, when a business provides mobile phones to its employees or when a parent gives a mobile phone to their children, there is no existing procedure for allowing the subscriber to set limits on the amount of air time or charges incurred on the MS 20. In addition, if an MS 20 is stolen, the person in wrongful possession typically has ample time to place numerous calls for unlimited durations before the MS 20 is reported stolen and service is discontinued.

One known method of controlling mobile telephone usage is the prepaid service feature, which is provided by many network operators. This feature is used by network operators to encourage new subscribers with poor credit history to purchase wireless services. For example, an operator may sell to such a subscriber a specified amount of usage which is allocated to the subscriber. Once that specified amount is reached, the MS will no longer function until the subscriber purchases additional usage from the operator. However, the subscriber must pay in advance for the service, and is unable to modify or reset the usage limits independently.

It is therefore one object of the invention to allow subscribers to define usage limits for their MS, with or without the assistance of the network operator, based on charging information or the amount of air time.

SUMMARY OF THE INVENTION

The present invention is directed to telecommunications systems and methods for allowing the owner of a MS to define usage limits. The limits can be based on air time usage or by a dollar amount, e.g., charging information. When the limits are exceeded, calls placed to or from the Mobile Station will fail, except for emergency calls or calls to predefined numbers established by the subscriber. The accumulated usage (time/dollar amount) can be reset and the MS returned to normal operation by the subscriber using a predetermined password set by the subscriber.

Advantageously, the business or private owner of a Mobile Station will be able to control the amount of charges incurred on their MSs. Furthermore, when the MS has been stolen, the MS will only allow the person in wrongful possession to use the MS for the defined time or dollar amount set by the subscriber. After the limit has been reached, the MS will be inoperable, until reset, using the appropriate subscriber-defined password, as stated hereinbefore, which protects both the subscriber and the cellular network operator from incurring exorbitant charges.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
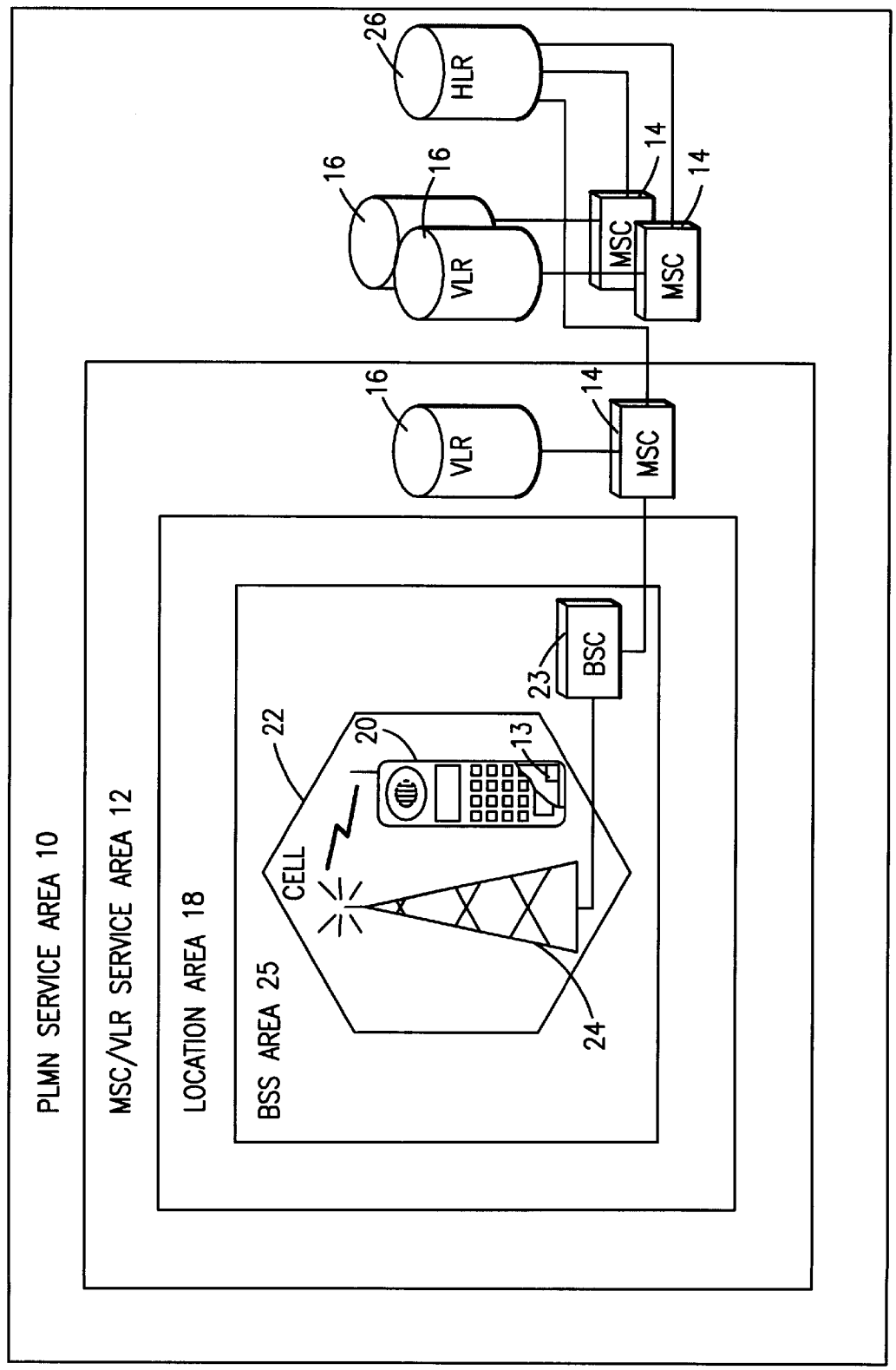
FIG. 1 is a block diagram of a conventional terrestrially-based wireless telecommunications system.
Figure 2:
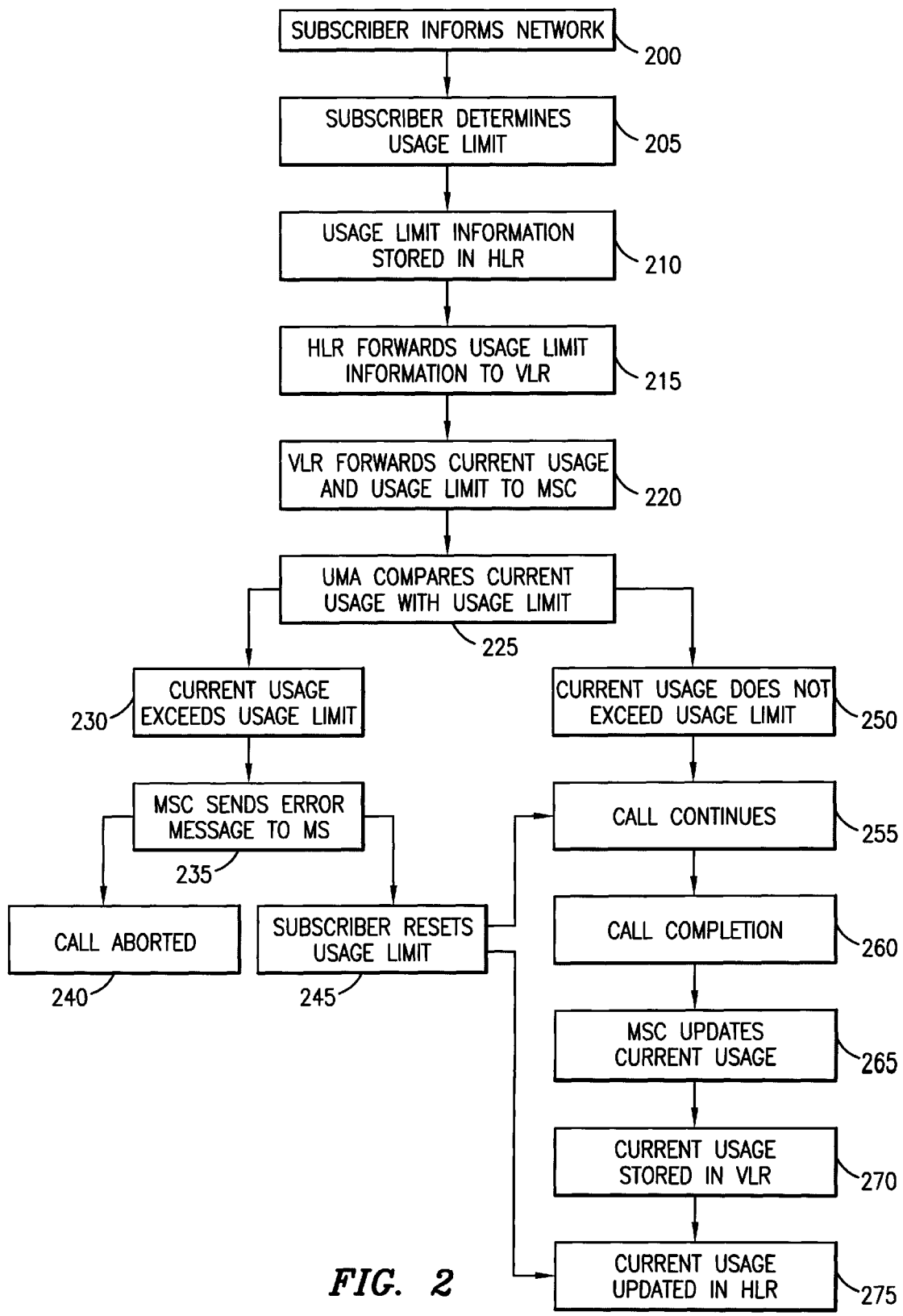
FIG. 2 is a flow chart outlining steps in a sample embodiment of the user-defined usage limits system and method of the present invention.
Figure 3:
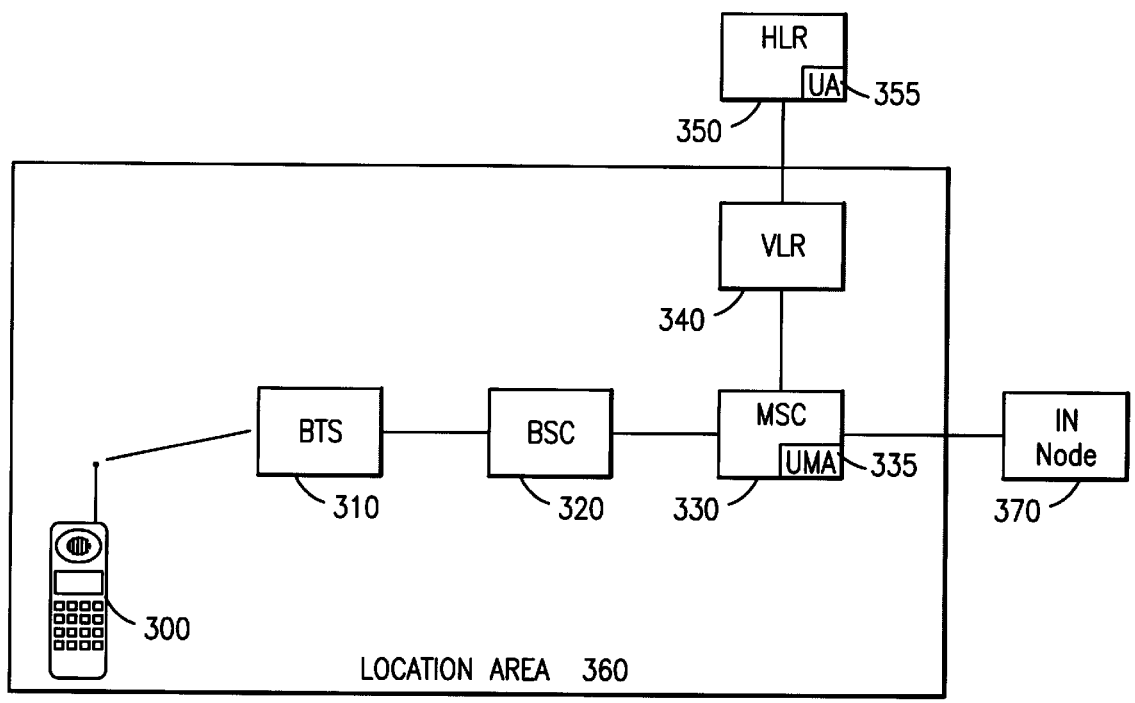
FIG. 3 is a block diagram depicting the interrelationship of some of the various elements of the present invention.

With reference now to FIG. 2 of the drawings, steps in a sample embodiment of the present invention are illustrated in which a mobile subscriber is allowed to define usage limits based on either air time usage or charging information to control the amount of charges incurred on the subscribers MS. The implementation of the steps in the sample embodiment of the present invention will be discussed with reference to FIG. 3 of the drawings.

Initially, the subscriber informs the network operator either prior to activation or after activation of service that the subscriber would like to limit usage of the MS 300 (step 200), typically by purchasing this feature from the operator. At any time thereafter, the subscriber can define the usage limits based on the amount of air time or charging information (step 205). If the subscriber would like to limit usage based on air time, the subscriber selects a maximum amount of air time that the subscriber is willing to pay for, e.g., ten hours a month. If, however, the subscriber would like to limit usage based on charging information, the subscriber selects a maximum amount to be billed, e.g., forty dollars a month. This usage limit information is preferably stored in the HLR 350 serving the subscriber (step 210), and will be forwarded to a VLR 340 when the MS 300 enters the Location Area (LA) 360 for which the VLR 340 is responsible (step 215).

However, it should be noted that the usage limit information can be stored in other locations as well. For example, if the network operator for the subscriber is in the Intelligent Network (IN), the subscriber information stored in the VLR 340 from the HLR 350 will instruct the MSC 330 to route the usage definition request to the IN node 370, or other type of intelligent node, where the usage limits will be stored. Alternatively, the MS 300 itself could store the user-defined usage limits in, for example, the SIM card 13, or other memory.

The usage limits can be defined by either conveying the usage limit information to the operator, e.g., in person or by system response prompts, or by manually entering the information from the MS 300 itself. If the subscriber defines the limits through commands entered on the MS 300, the MS 300 can initiate an Unstructured Supplementary Service Data (USSD) message, or some form of Man Machine Interface (MMI) message, to relay the usage limit information to the MSC 330. By utilizing a USSD message, the MS 300 is able to define usage limits without establishing a speech connection with the serving MSC 330.

After receiving the USSD message, the BTS 310 and the BSC 320 forward the message transparently to the MSC 330. A USSD handler within the MSC 330 then retrieves the USSD message and extracts the encapsulated data, as is well understood in the art. In this case, the USSD message would request to define usage limits, which would cause the USSD handler within the MSC 330 to forward the request to a "Usage Application" 355 in the HLR 350. The HLR 350 Usage Application 355 retrieves the subscriber information and confirms that the requesting MS 300 has a subscription to define limits. Subsequently, the Usage Application 355 within the HLR 350 alters the subscriber information with the given usage limits. For example, the subscriber could enter on the MS 300: *SC*PW*LIMIT#SEND, where SC is a service code indicating to the HLR 350 that the subscriber would like to define usage limits, PW is a password for security, and LIMIT is the defined usage limit.

After the usage limits have been defined by the subscriber (step 205), the subscriber has the ability to turn the usage limits on and off. For example, if a parent has defined usage limits for a child, but would prefer to have the limits apply only when the child has possession of the MS 300, the parent can enter a service code on the MS 300 instructing the MSC 330 to turn on the usage limits prior to giving the MS 300 to the child, and then turn them off again, by USSD or other MMI message, when the MS 300 is returned. Alternatively, the parent could define a limit for the child, and then when the MS 300 is returned, redefine the limit for self-usage in the manner stated hereinbefore.

During the setup of a call, the MSC 330 serving the LA 360 that the MS 300 is in will obtain from the VLR 340 the current usage amount and the usage limits defined by the subscriber (step 220). Thereafter, a "Usage Monitoring Application" 335 within the MSC 330 will check the current usage amount and compare it with the defined usage limit (step 225). If the current usage amount exceeds the usage limit (step 230), the MSC 330 will send an error message, e.g., a specific cause code or other error message, to the MS 300 indicating excessive usage (step 235), and the call will be aborted (step 240), unless the call is an emergency call, or a call to a predefined number established by the subscriber, e.g., a call to home or to the office. The error message could be displayed on the MS 300 itself, or could be routed to a message machine that the subscriber listens to. However, if the current usage amount does not exceed the usage limit (step 250), the call will be allowed to continue as normal (step 255), as is well-known in the art.

If the mobile subscriber receives an error message indicating excessive usage (step 235), the subscriber has the ability to reset the current accumulated usage (step 245) from the MS 300 and continue the call (step 255) The reset procedure is preferably password protected to prevent resetting of the limits without the subscribers consent. The process can be done again with a USSD message or other MMI message, where the service code (SC) would indicate that the subscriber would like to reset the user limit feature.

Upon reception of the resetting message, the MSC 330 will reset the accumulated usage to zero in the VLR 340 and signal the HLR 350 to update the current usage information accordingly.

It should be noted that in alternative embodiments, the usage limits can be reset or redefined from a phone different than the MS 300 via the Short Message Service (SMS). For example, if an employee has possession of the MS 300 in a location different from that of the business, and the business would like to reset the limit to allow the employee to continue using the MS 300 without requiring the employee to return, the business can instruct another phone to send a message, e.g., via USSD message, to the MS 300 to redefine or reset the limits.

At call completion (step 260), the "Usage Monitoring Application" 335 within the MSC 330 will update the current usage amount (step 265), e.g., the amount of time or money spent since activation of the usage limit feature, based upon the amount of usage for the given call, and store it in the VLR 340 (step 270). The current usage amount will then be updated in the HLR 350 (step 275) when the MS 300 registers in another MSC 330. This is accomplished by the HLR 350 retrieving the current usage amount from the previous VLR 340, deleting the subscriber data from the previous VLR 340, and sending the updated subscriber data to the new VLR 340.

Additionally, in preferred embodiments of the user-defined usage limit system and method of the present invention, a mobile subscriber will be able to request from the system the current accumulated usage and the defined usage limits. Using a USSD or other MMI message, as discussed above, sent from the Mobile Station 300 transparently to the MSC 330, the current usage amount and defined usage limit can be retrieved from the VLR 340 and returned to the MS 300 where the information can be displayed or indicated via system message to the user.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for allowing a mobile subscriber to define limits on usage for a mobile terminal associated with said mobile subscriber, said telecommunications system comprising:

a memory containing a current cumulative usage value associated with an amount of usage of said mobile terminal and a usage limit value defined by said mobile subscriber to monitor the usage of said mobile terminal, said usage limit value defining only a portion of a usage subscription plan subscribed to by said mobile subscriber; and a mobile services center in wireless communication with said mobile terminal and connected to said memory to obtain said usage limit value and said current cumulative usage value, said mobile services center comparing said current usage value with said usage limit value and selectively denying said mobile terminal access to said telecommunications system when said current usage value exceeds said usage limit value, said mobile services center allowing said mobile terminal access to said telecommunications system in response to receiving a reset command from said mobile subscriber, said reset command setting said current cumulative usage value to zero without requiring additional value to be paid by said mobile subscriber.

2. The telecommunications system of claim 1, wherein said usage limit value includes a maximum amount of air time usage.

3. The telecommunications system of claim 1, wherein said usage limit value includes a maximum monetary amount to be charged.

4. The telecommunications system of claim 1, further comprising a home location register in communication with said mobile services center, said memory being located within said home location register.

5. The telecommunications system of claim 4, further comprising a visitor location register in communication with said home location register and said mobile services center, said usage limit value and said current cumulative usage value being forwarded to said visitor location register from said home location register when said mobile terminal is located within the area serviced by said visitor location area.

6. The telecommunications system of claim 4, wherein said usage limit value is set and stored by a usage application within said home location register.

7. The telecommunications system of claim 1, further comprising an intelligent node in communication with said mobile services center, said memory being located within said intelligent node.

8. The telecommunications system of claim 1, wherein said memory is located within said mobile terminal.

9. The telecommunications system of claim 1, wherein said memory is located within said mobile terminal.

10. The telecommunications system of claim 1, wherein said mobile services center includes a usage monitoring application for comparing said usage limit value with said current cumulative usage value.

11. The telecommunications system of claim 1, wherein an error message is sent to said mobile terminal by said mobile services center when said current cumulative usage value exceeds said usage limit value.

12. The telecommunications system of claim 1, wherein said mobile terminal is allowed access to said telecommunications system when said mobile terminal places a call to an emergency number.

13. The telecommunications system of claim 1, wherein said mobile terminal is allowed access to said telecommunications system when said mobile terminal places a call to a predefined number.

14. The telecommunications system of claim 1, wherein said reset command includes a password associated with said mobile subscriber.

15. The telecommunications system of claim 1, wherein said current cumulative usage value and said usage limit value are communicated to said mobile subscriber through said mobile terminal.

16. The telecommunications system of claim 1, wherein said reset command is sent from said mobile terminal to said mobile services center in an unstructured supplementary service data message.

17. The telecommunications system of claim 1, wherein said usage limit value is deactivated by said mobile subscriber, said mobile services center allowing said mobile terminal access to said telecommunications system in response to said usage limit value being deactivated.

18. A method for allowing a mobile subscriber to define limits on usage for a mobile terminal associated with said mobile subscriber, said method comprising the steps of:

defining, by said mobile subscriber, a usage limit value to monitor the usage of said mobile terminal, said usage limit value defining only a portion of a usage subscription plan subscribed to by said mobile subscriber;

storing said usage limit value in a memory within said telecommunications system, said memory including a current cumulative usage value associated with an amount of usage of said mobile terminal;

accessing, by a mobile services center in wireless communication with said mobile terminal, said memory to retrieve said usage limit value and said current cumulative usage value;

comparing said usage limit value and said current cumulative usage value;

selectively restricting access to said telecommunications system when said current cumulative usage value exceeds said usage limit value; and allowing access to said telecommunications system in response to receiving a reset command from said mobile subscriber, said reset command setting said current cumulative usage value to zero without requiring additional value to be paid by said mobile subscriber.

19. The method of claim 18, wherein said usage limit value includes a maximum amount of air time usage.

20. The method of claim 18, wherein said usage limit value includes a maximum monetary amount to be charged.

21. The method of claim 18, wherein said telecommunications system further comprises a home location register in communication with said mobile services center, said memory being located within said home location register.

22. The method of claim 21, wherein said telecommunications system further comprises a visitor location register in communication with said home location register and said mobile services center, and further comprising the step of:

after said step of defining, forwarding said usage limit value and said current cumulative usage value to said visitor location register from said home location register when said mobile terminal is located within the area serviced by said visitor location area.

23. The method of claim 21, wherein said step of defining is performed by a usage application within said home location register, said usage application updating said current cumulative usage value.

24. The method of claim 18, wherein said telecommunications system further comprises an intelligent node in communication with said mobile services center, said memory being located within said intelligent node.

25. The method of claim 18, wherein said memory is located within said mobile terminal.

26. The method of claim 18, wherein said mobile terminal has a subscriber identity module therein, said memory being located within said subscriber identity module.

27. The method of claim 18, wherein said step of comparing is performed by a usage monitoring application within said mobile services center.

28. The method of claim 18, wherein said mobile services center sends an error message to said mobile terminal when said current cumulative usage value exceeds said usage limit value.

29. The method of claim 18, wherein said mobile terminal is allowed access to said telecommunications system when said mobile terminal places a call to an emergency number.

30. The method of claim 18, wherein said mobile terminal is allowed access to said telecommunications system when said mobile terminal places a call to a predefined number.

31. The method of claim 18, wherein said reset command includes a password associated with said mobile subscriber.

32. The method of claim 18, wherein said current cumulative usage value and said usage limit value are communicated to said mobile subscriber through said mobile terminal.

33. The method of claim 18, wherein said step of defining is performed by said mobile subscriber entering said usage limit value on said mobile terminal, and said mobile terminal sending said usage limit value to said mobile services center, using an unstructured supplementary service data message.

34. The method of claim 18, further comprising the step of:

after said step of defining, activating said usage limit value, and placing a call on said mobile terminal.

35. The method of claim 18, further comprising the step of:

after said step of defining, deactivating said usage limit value, and placing a call on said mobile terminal, said mobile terminal being allowed access to said telecommunications system in response to said usage limit value being deactivated.

* * * * *